United States Patent
Chen et al.

(10) Patent No.: US 8,281,095 B2
(45) Date of Patent: Oct. 2, 2012

(54) DATA STORAGE SYSTEM AND BACKUP METHOD THEREOF

(75) Inventors: Po-Yuan Chen, Hsinchu County (TW); Jue-Wen Liu, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 283 days.

(21) Appl. No.: 12/707,060

(22) Filed: Feb. 17, 2010

(65) Prior Publication Data
US 2010/0235595 A1 Sep. 16, 2010

(30) Foreign Application Priority Data
Mar. 13, 2009 (TW) ................................ 98108330 A

(51) Int. Cl.
*G06F 12/00* (2006.01)

(52) U.S. Cl. ..................................................... 711/162

(58) Field of Classification Search .................. None
See application file for complete search history.

(56) References Cited

U.S. PATENT DOCUMENTS

| 7,188,125 | B1 * | 3/2007 | Karr ....................................... 1/1 |
| 8,074,035 | B1 * | 12/2011 | Per et al. ........................ 711/162 |
| 2009/0113435 | A1 * | 4/2009 | Mizrachi et al. .............. 718/102 |
| 2010/0311451 | A1 * | 12/2010 | Hirai ............................. 455/507 |

FOREIGN PATENT DOCUMENTS

| CN | 1928833 A | 3/2007 |
| CN | 1940876 A | 4/2007 |
| CN | 101051284 A | 10/2007 |
| CN | 101072088 A | 11/2007 |
| CN | 101201765 A | 6/2008 |
| TW | 583644 B | 4/2004 |
| TW | 200737180 | 10/2007 |

* cited by examiner

*Primary Examiner* — Duc Doan
(74) *Attorney, Agent, or Firm* — Rabin & Berdo, P.C.

(57) ABSTRACT

A data storage system and the backup method thereof are provided. The data storage system includes a storage device and a storage controller. The storage controller is coupled to the storage device and used for dividing the storage device into a primary data block and a backup data block and setting the data storage system to operate under one of a real time backup mode and a non-real time backup mode. Under the non-real time backup mode, the storage controller backups the data stored in the primary data block to the backup data block when the data storage system is idle.

28 Claims, 5 Drawing Sheets

DATA STORAGE SYSTEM AND BACKUP METHOD THEREOF

This application claims the benefit of Taiwan application Serial No. 98108330, filed Mar. 13, 2009, the subject matter of which is incorporated herein by reference.

BACKGROUND OF THE INVENTION

1. Field of the Invention

The invention relates in general to a data storage system and a data backup method thereof, and more particularly to a data storage system capable of backing up data in non-real time and a data backup method thereof.

2. Description of the Related Art

In modern society where the volume of information grows dramatically, whether important data or information can be properly preserved is highly valued by people. Thus, the data storage system with data backup function capable of completely preserving data has attracted consumers' attention.

At the same time, a conventional data storage system with backup function requires at least two independent storage devices (such as hard disc), wherein a storage device is used for storing original data, and the other storage device is used for storing backup data. Therefore, a cost of the conventional data storage system with backup function is too expensive. Besides, the conventional data storage system with backup function back ups data by way of backing up the entire original data regardless whether the data is important or not, hence decreasing the utility rate of the storage device. Also, the conventional data storage system back ups data under the real time backup mode (that is, the original data and the backup data are stored at the same time), hence deteriorating the transmission efficiency of the conventional data storage system.

Thus, how to effectively decrease the cost and increase the utility rate and availability of the data storage system without affecting the efficiency has become a focus in research and development of the data storage system.

SUMMARY OF THE INVENTION

The invention is directed to a data storage system and a backup method thereof. Data backup is achieved by using one independent storage device, hence effectively reducing cost.

The invention is directed to a data storage system and a backup method thereof. The user can flexibly set the size of the data backup block used for storing the backup data so as to increase the utility rate.

The invention is directed to a data storage system and a backup method thereof. The user can further determine whether to backup data according to the importance of data so as to increase the utility rate.

The invention is directed to a data storage system and a backup method thereof. Through non-real time backup, the data storage efficiency is prevented from being deteriorated.

According to a first aspect of the present invention, a data storage system including a storage device and a storage controller is provided. The storage controller is coupled to the storage device and used for dividing the storage device into a primary data block and a backup data block and setting the data storage system to operate under one of a real time backup mode and a non-real time backup mode. Under the non-real time backup mode, the storage controller back ups the data stored in the primary data block to the backup data block when the data storage system is idle.

According to a second aspect of the present invention, a backup method applied to a data storage system is provided. The backup method includes the following steps. Firstly, a storage device of the data storage system is divided into a primary data block and a backup data block. Then, the data storage system is set to operate under one of a real time backup mode and a non-real time backup mode. After that, when the data storage system is operated under a non-real time backup mode and the data storage system is idle, the data stored in the primary data block is backed up to the backup data block.

The invention will become apparent from the following detailed description of the preferred but non-limiting embodiments. The following description is made with reference to the accompanying drawings.

DETAILED DESCRIPTION OF THE INVENTION

Figure 1:
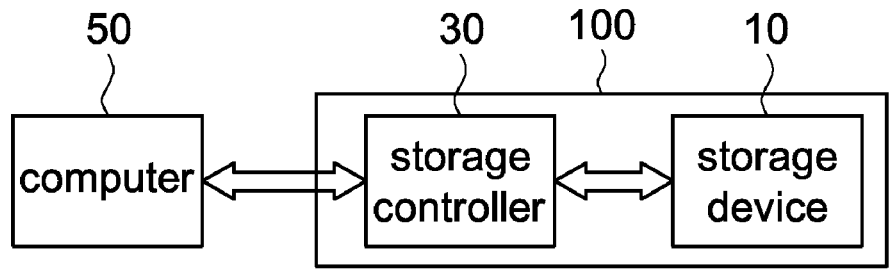
FIG. 1 shows a block diagram of a data storage system of an embodiment of the invention.

Referring to FIG. 1, a block diagram of a data storage system of an embodiment of the invention is shown. The data storage system 100 includes a storage device 10 and a storage controller 30. The computer 50 is connected to the data storage system 100 and transmits an original data and a service request to the data storage system 100. Under the control of the storage controller 30, the original data transmitted by the computer 50 is stored in the storage device 10. For example, the storage device 10 is a hard disc.

Figure 2:
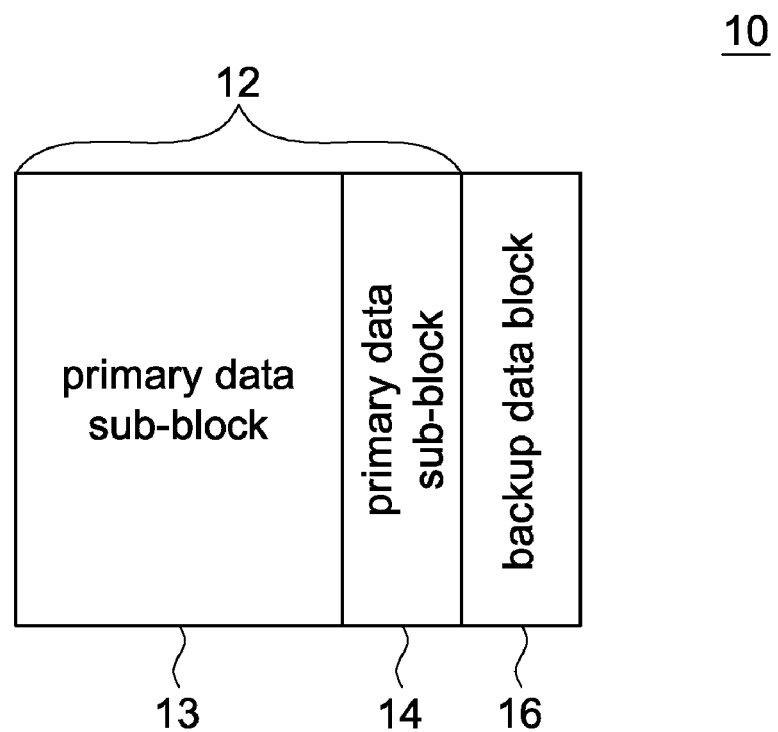
FIG. 2 shows the division of a storage device of a data storage system.

FIG. 2 shows a diagram of the division for a storage device of a data storage system in FIG. 1. Under the control of the storage controller 30, the storage device 10 can be divided into a primary data block 12 and a backup data block 16. The storage controller 30 divides the primary data block 12 and the backup data block 16 according to the ratio of N:1 as set by the user. Furthermore, under the control of the storage controller 30, the primary data block 12 can be divided into a primary data sub-block 13 and a primary data sub-block 14. The storage controller 30 determines the size and the initial address of the primary data sub-block 13 and the primary data sub-block 14 according to the size and the initial address of the backup data block 16, wherein the sizes of the backup data block 16 and the primary data sub-block 14 are substantially the same.

The original data stored in the primary data sub-block 13 does not need to be backed up. That is, the primary data sub-block 13 is used for storing the user data that does not need to be backed up. On the other hand, the original data stored in the primary data sub-block 14 needs to be backed up. That is, the primary data sub-block 14 is used for storing the data that needs to be backed up. The sizes of the primary data sub-block 14 and the backup data block 16 are substantially the same. The backup data block 16 is used for storing the backup data obtained by backing up the data stored in the primary data sub-block 14.

The storage controller 30 is used for determining the service request transmitted to the data storage system 100 by the computer 50. Examples of the service request include access service request, write service request. The storage controller 30 determines whether to backup data. Besides, the storage controller 30 backups data according to the backup mode set by the user. Examples of the backup mode include the real time backup mode and the non-real time backup mode. Under the real time backup mode, when the computer 50 transmits data to the primary data sub-block 14, the storage controller 30 copies the data to the data backup block 16 in real time. Under the non-real time backup mode, after the computer 50 transmits data to the primary data sub-block 14, the storage controller 30 copies (backups) the data to data backup block 16 only when the data storage system 100 is idle.

Under the real time backup mode, when data backup is executed, the write efficiency of the data storage system 100 is affected. In addition, under the non-real time backup mode, the data storage system 100 back up the data that needs to be backed up only when the computer 50 is idle. When the computer 50 transmits a service request, then backup is paused until the data storage system 100 has completed the service request. Thus, the write efficiency of the computer 50 is not affected when the data storage system 100 executes data backup.

Figure 3A:
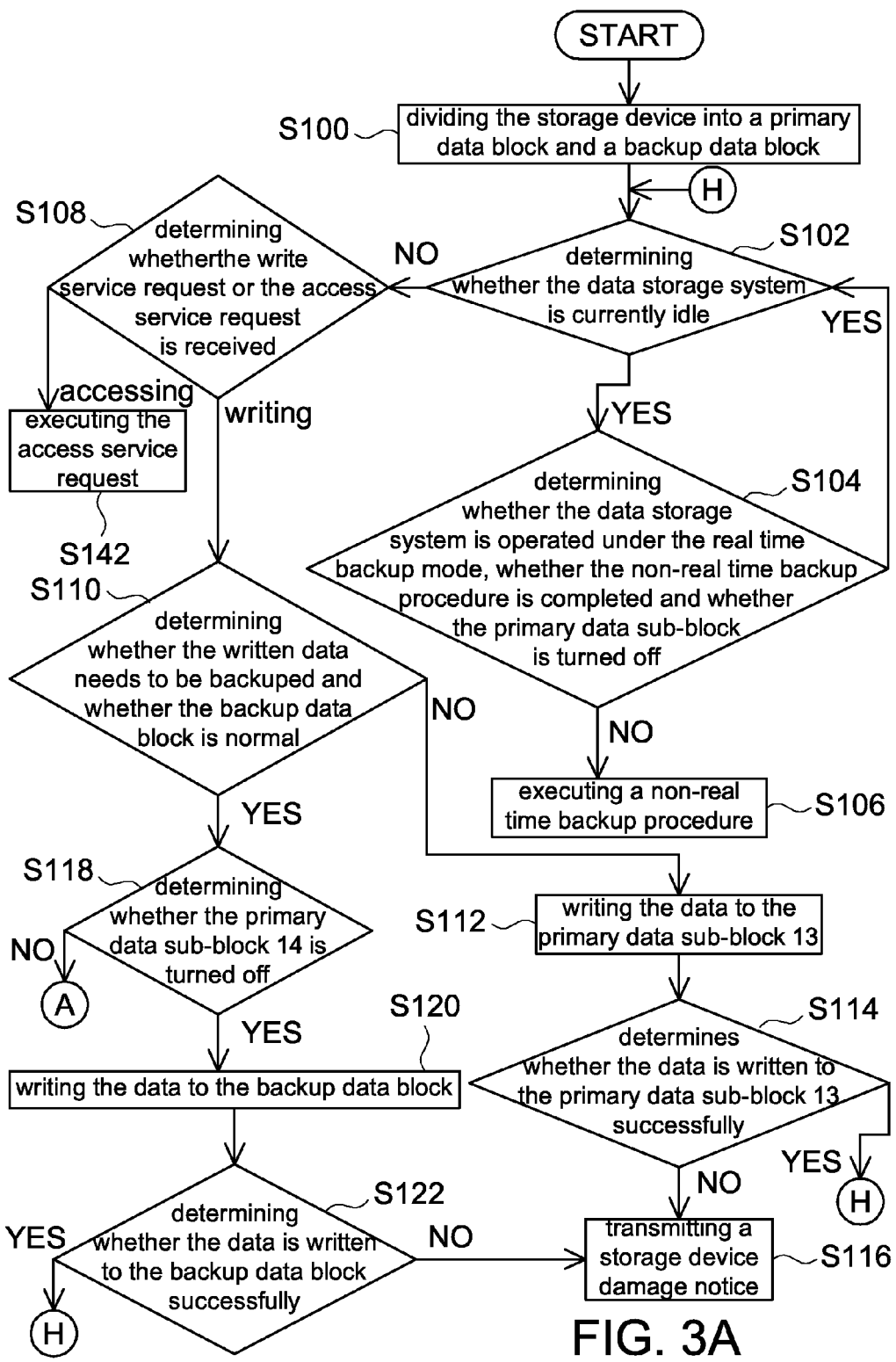
FIGS. 3A and 3B show a flowchart of data backup of an embodiment of the invention.
Figure 3B:
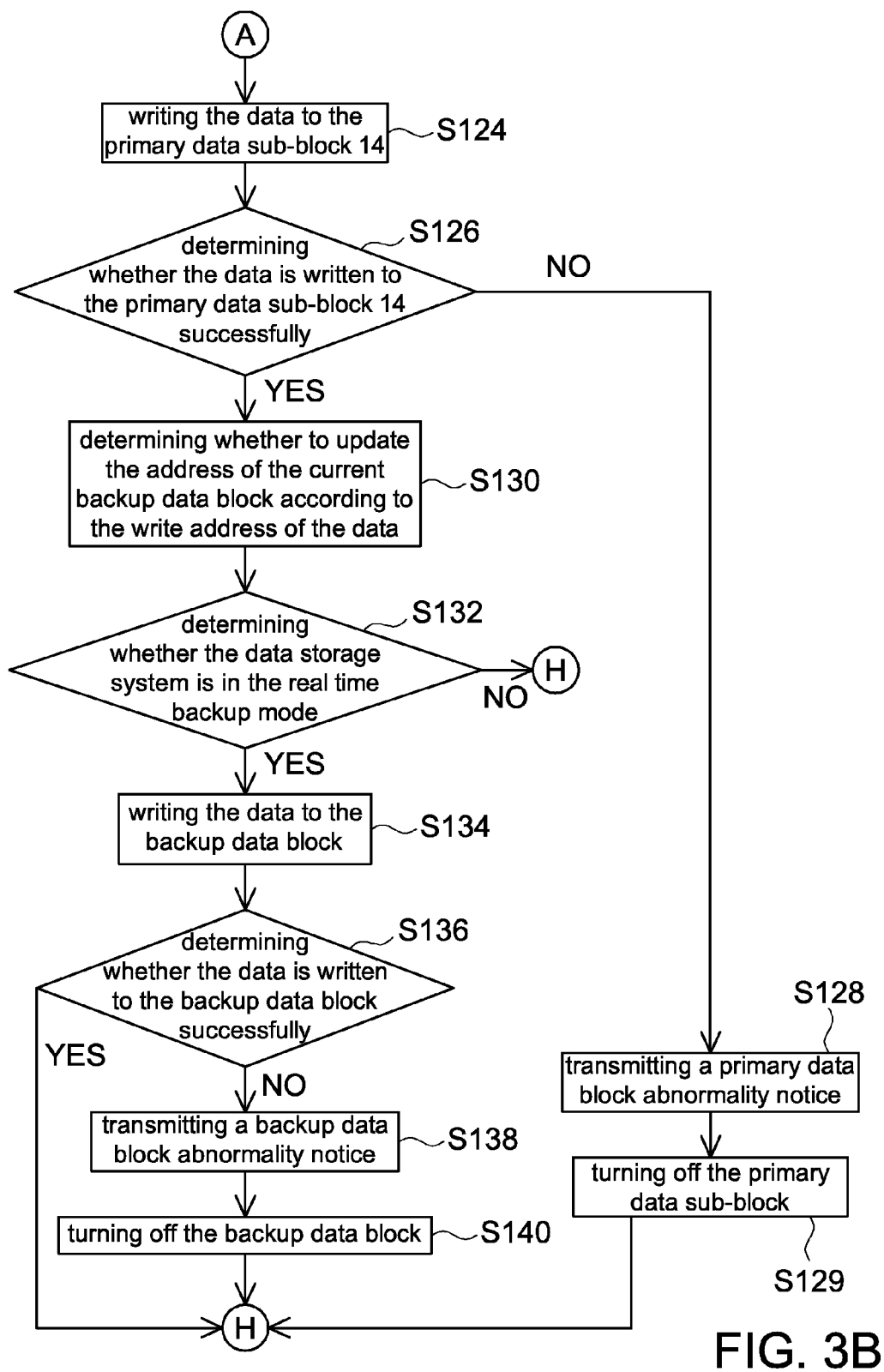

How the present embodiment of the invention performs data backed up is disclosed below, while referring to FIG. 1, FIG. 2 and FIG. 3A. FIG. 3A is a flowchart of data backup of an embodiment of the invention.

Firstly, the method begins at step S100, the storage device is divided into a primary data block 12 and a backup data block 16. The user determines whether the data storage system 100 is operated under the real time backup mode or the non-real time backup mode.

In step S102, the storage controller 30 determines whether the data storage system 100 is currently idle. If the data storage system 100 is idle, the method proceeds to step S104. If the data storage system 100 is not idle, the method proceeds to step S108.

In step S104, the storage controller 30 determines whether the data storage system 100 is operated under the real time backup mode, whether the non-real time backup procedure is completed and whether the primary data sub-block 14 is turned off. If the above three determination results are all negative, the method proceeds to step S106; if one of the three determination results is affirmative, the method returns to step S102.

In step S106, the storage controller 30 executes a non-real time backup procedure. When the data storage system 100 is idle and is operated under the non-real time backup mode, the storage controller 30 can execute the non-real time backup procedure if the non-real time backup procedure has not yet been completed (that is, the non-real time backup procedure finish flag is not set) and the primary data block has not yet been turned off (that is, the primary data block turned-off flag is not set). In other words, if one of the flags is set, the non-real time backup procedure will not be executed.

Figure 4:
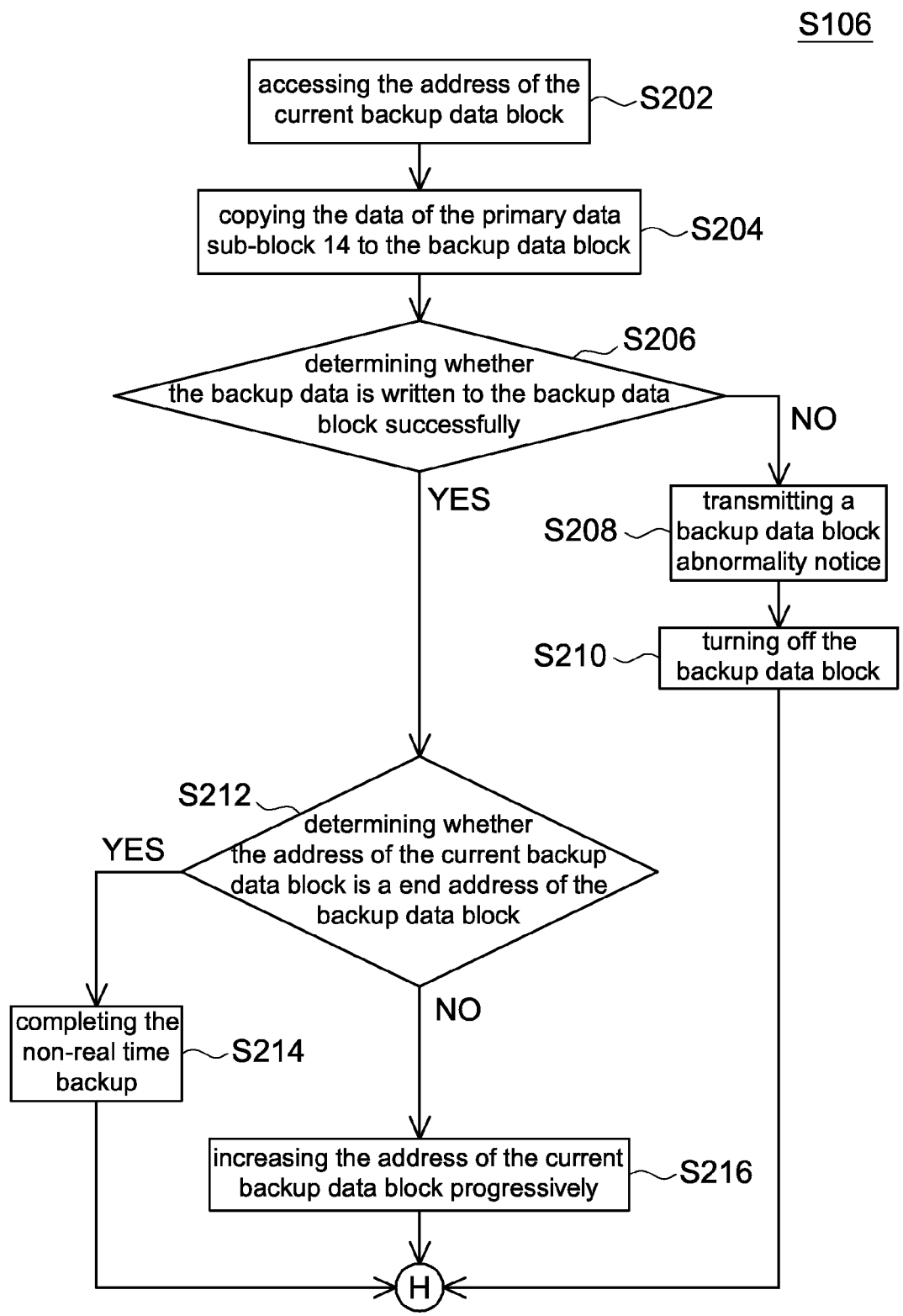
FIG. 4 shows detailed procedures of the step S106 of FIG. 3A.

Referring to FIG. 4, detailed procedures of the step S106 of FIG. 3A are shown. Step 106 further includes a number of sub-steps S202-S216. Firstly, in step S202, the storage controller 30 accesses the address of the current backup data block.

In step S204, the data of the primary data sub-block 14 is copied to the backup data block 16 according to the address of the current backup data block.

In step S206, the storage controller 30 determines whether the backup data is successfully written to the backup data block 16. If the backup data is not successfully written to the backup data block 16, the method proceeds to step S208. On the other hand, if the backup data is successfully written to the backup data block 16, the method proceeds to step S212.

The backup data is not successfully written to the backup data block 16 indicates that the backup data block 16 may be abnormal or damaged, therefore the method proceeds to step S208, the storage controller 30 transmits a backup data block abnormality notice to inform the user.

Next, the method proceeds to step S210, as the storage controller 30 determines that the backup data block 16 is abnormal or damaged, the storage controller 30 turns off the backup data block 16 to avoid trying to write the backup data to the backup data block 16 which may affect the write efficiency. Afterwards, the method returns to step S102.

In step S212, the storage controller 30 determines whether the address of the current backup data block is an end address of the backup data block. If yes, then the non-real time backup procedure is completed and the non-real time backup finish flag is set. After that, the method returns to step S214. If no, this indicates that the non-real time backup procedure has not yet been completed, then the method returns to step S216.

In step S214, the storage controller 30 has completed the non-real time backup, that is, the non-real time backup finish flag is set. Then, the method returns to step S102.

In step S216, the address of the current backup data block is progressively increased so that when the data storage system 100 is idle again, the next item of data stored in the primary data sub-block 14 is backed up to the backup data block 16 in non-real time. Thereafter, the method returns to step S102, whether the system 100 is idle is confirmed again for finishing the non-real time backup procedure.

Referring to FIG. 3A. In step S108, the storage controller 30 determines whether the write service request or the access service request is received. When the storage controller 30 receives the service request transmitted by the computer 50, the storage controller 30 determines whether the service request is a write service request or an access service request. If the service request received by the storage controller 30 is a write service request, then the method proceeds to steps S110~S140 for writing the data to the primary data sub-block 13 (if this item of data does not need to be backed up), the primary data sub-block 14 (if this item of data needs to be backed up) or the backup data block 16. If the service request received by the storage controller 30 is an access service request, then the method proceeds to step S142.

In step S110, the storage controller 30 determines whether the written data needs to be backed up and determines whether the backup data block 16 is normal. If the written data does not need to be backed up or the backup data block 16 is abnormal, the method proceeds to steps S112~S116 for writing the data to the primary data sub-block 13. If the written data needs to be backed up and the backup data block 16 is normal, the method proceeds to steps S118~S122 for writing the data that needs to be backed up to the backup data block 16.

In step S112, the storage controller 30 writes the data to the primary data sub-block 13.

In step S114, the storage controller 30 determines whether the data is successfully written to the primary data sub-block 13. If the data is not successfully written, the method proceeds to step S116. If the data is successfully written, the method returns to step S102.

In step S116, the storage controller 30 transmits a storage device damage notice.

In step S118, the storage controller 30 determines whether the primary data sub-block 14 is turned off (that is, check whether the primary data block turned-off flag is set). If the primary data sub-block 14 is turned off (that is, the primary data block turned-off flag is set), the method proceeds to steps S120-S122 for writing the data to the backup data block 16. If the primary data sub-block 14 is not turned off, the method proceeds to steps S124-S129 for writing the data to the primary data sub-block 14.

In step S120, the storage controller 30 writes data to the backup data block 16.

In step S122, the storage controller 30 determines whether the data is successfully written to the backup data block 16. If the data is written successfully to the backup data block 16, the method returns to step S102. If the data is not successfully written to the backup data block 16, a storage device damage notice is transmitted (step S116).

In step S124, the storage controller 30 writes the data to the primary data sub-block 14.

In step S126, the storage controller 30 determines whether the data is successfully written to the primary data sub-block 14. If the data is not successfully written to the primary data sub-block 14, the method proceeds to step S128. If the data is successfully written to the primary data sub-block 14, the method proceeds to step S130.

In step S128, the storage controller 30 transmits a primary data block abnormality notice. Consequently, if the storage controller 30 is operated under the non-real time backup mode, the storage controller 30 requests the computer 50 to re-transmit the write service request to write the data to the backup data block 16.

In step S129, the storage controller 30 turns off the primary data sub-block 14. After that, the method returns to step S102.

In step S130, the storage controller 30 determines whether to update the address of the current backup data block according to the write address of the data. To put it in greater details, the storage controller 30 compares the write address of the data with the address of the current backup data block. If the write address of the data is smaller than the address of the current backup data block, the storage controller 30 updates the address of the current backup data block as the write address of the data. If the write address of the data is greater than the address of the current backup data block or the data needs to be written to the primary data sub-block 13 (that is, this item of data does not need to be backed up), the storage controller 30 does not change the address of the current backup data block and the data is directly written to the primary data sub-block 13.

In step S132, the storage controller 30 determines whether the data storage system 100 is in the real time backup mode. If the data storage system 100 is not in the real time, the method returns to step S102. If the data storage system 100 is in the real time backup mode, the method proceeds to steps S134-140 for writing the data to the backup data block 16.

In step S134, the storage controller 30 writes the data to the backup data block 16.

In step S136, the storage controller 30 determines whether the data is successfully written to the backup data block 16. If the data is successfully written to the backup data block 16, the method skips to step S102. If the data is not successfully written to the backup data block 16, the method proceeds to step S138.

In step S138, the storage controller 30 transmits a backup data block abnormality notice to inform the user. Meanwhile, the data storage system 100 is incapable of backing up data.

In step S140, the storage controller 30 turns off the backup data block 16, then the method returns to step S102.

In step S142, the storage controller 30 executes the access service request.

In the present embodiment of the invention, if the primary data block 12 or the backup data block 16 is turned off, the user had better to replace the data storage system 100 and backup the data stored in the data storage system 100 to another system 100. That is, the user does not replace and backup the data stored in the data storage system 100 when both the primary data block 12 and the backup data block 16 are turned off.

Figure 5:
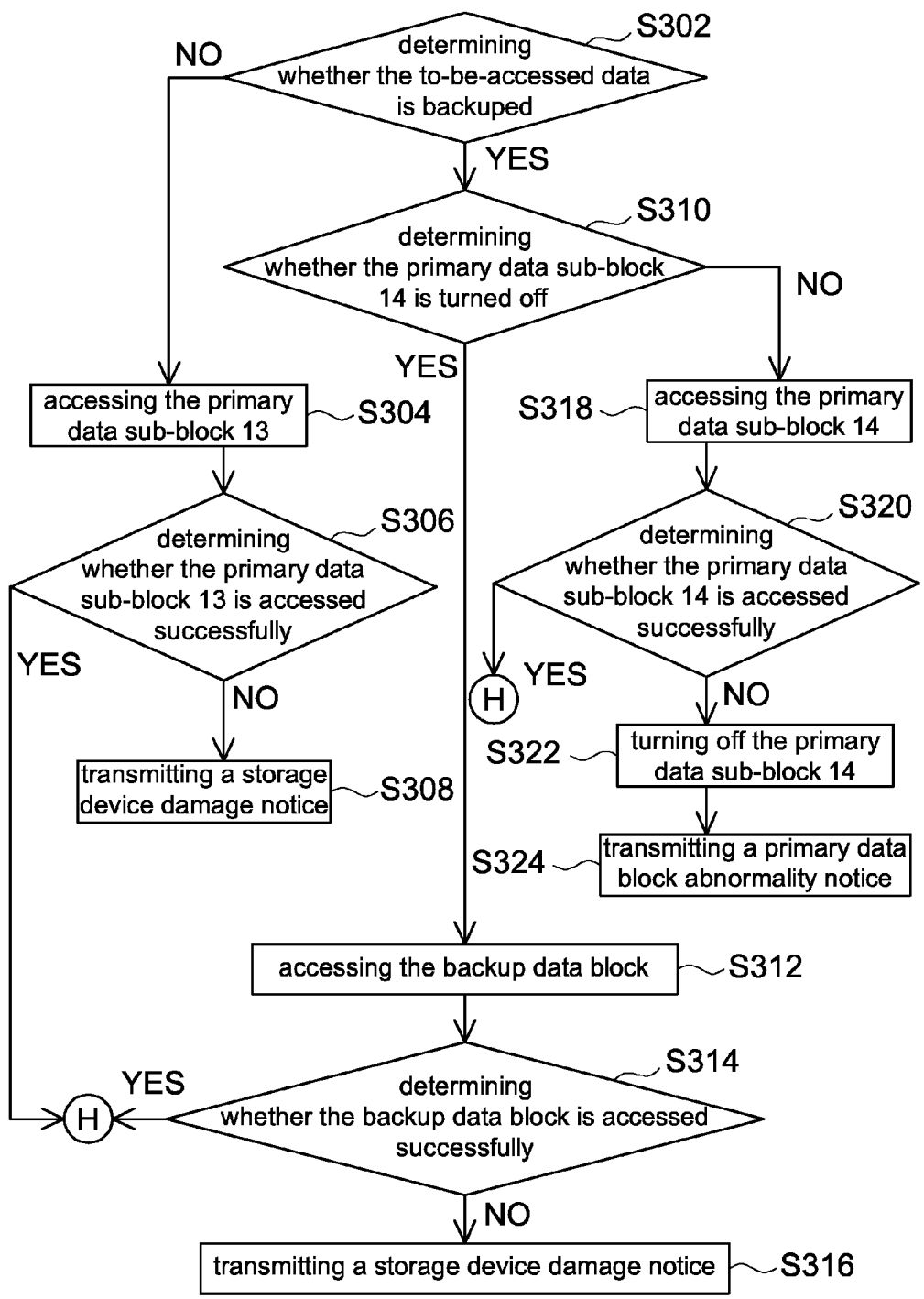
FIG. 5 shows detailed procedures of the access service request (step S142) of FIG. 3A.

Referring to FIG. 5, a diagram for detailed procedures of the access service request (step S142) of FIG. 3A is shown. Step S142 further includes a number of sub-steps S302~S324. In step S302, the storage controller 30 determines whether the to-be-accessed data is backed up. If the to-be-accessed data is not backed up, the method proceeds to steps S304~S308 for accessing the data from the primary data sub-block 13. If the to-be-accessed data is backed up, the method proceeds to steps S310~S324 for accessing the data from the primary data sub-block 14 (if the primary data sub-block 14 is normal) or from the backup data block 16 (if the primary data sub-block 14 is abnormal).

In step S304, the storage controller 30 accesses the primary data sub-block 13.

In step S306, the storage controller 30 determines whether the primary data sub-block 13 is successfully accessed. If yes, the method returns to step S102 of FIG. 3A. If no, the method proceeds to step S308.

In step S308, the storage controller 30 transmits a storage device damage notice to inform the user.

In step S310, the storage controller 30 determines whether the primary data sub-block 14 is turned off (that is, check whether the primary data block turned-off flag is set). If the primary data sub-block 14 is turned off (that is, the primary data block turned-off flag is set), the method proceeds to step S312. In addition, if the primary data sub-block 14 is not turned off, the method proceeds to step S318.

In step S312, the storage controller 30 accesses the backup data block 16.

In step S314, the storage controller 30 determines whether the backup data block 16 is accessed successfully. If yes, the method returns to step S102 of FIG. 3A. If no, the method proceeds to step S316.

In step S316, the storage controller 30 transmits a storage device damage notice to inform the user.

In step S318, the storage controller 30 accesses the primary data sub-block 14.

In step S320, the storage controller 30 determines whether the primary data sub-block 14 is accessed successfully. If yes, the method returns to step S102 of FIG. 3A. If no, the method proceeds to step S322.

In step S322, the storage controller 30 turns off the primary data sub-block 14 (that is, the storage controller 30 sets the primary data block turned-off flag).

In step S324, the storage controller 30 transmits a primary data block abnormality notice, and after the abnormality notice is transmitted, the method returns to step S102. Meanwhile, the storage controller 30 requests the computer 50 to re-transmit the access service request to access data from the backup data block 16. If the data cannot be accessed from the backup data block 16, then the storage controller 30 transmits a storage device damage notice.

The advantages of the data storage system and the backup method thereof according to the embodiment of the invention are disclosed below:

(1) The data storage system can execute data backup by one single storage device (such as a hard disc), so that the costs of the data storage system can be reduced.

(2) The size of the primary data block and the backup data block of the storage device is determined by the user, hence increasing the utility rate of the storage device.

(3) The user can determine whether to backup data or not according to the importance of the data, and can further select the data backup mode (the non-real time mode or the real time backup mode). Compared with the generally known real time backup mode, the write efficiency of the data storage system of the invention embodiment does not be affected under the non-real time backup mode during executing data backup.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data backup method applied to a data storage system, wherein the data backup method comprises:
    dividing a storage device of the data storage system into a primary data block and a backup data block;
    setting the data storage system to be operated under one of a real time backup mode and a non-real time backup mode; and
    backing up data stored in the primary data block to the backup data block when the data storage system is operated under the non-real time backup mode and the data storage system is idle.

2. The data backup method according to claim 1, further comprising
    dividing the primary data block into a first primary data sub-block and a second primary data sub-block, wherein data stored in the first primary data sub-block does not need to be backed up to the backup data block, but data stored in the second primary data sub-block needs to be backed up to the backup data block;
    determining whether the data storage system is in the real time backup mode, whether a non-real time backup procedure is completed and whether the primary data block is turned off when the data storage system is idle; and
    if the data storage system is not in the real time mode, the non-real time backup procedure is not completed, and the primary data block is not turned off, the non-real time backup procedure is executed.

3. The data backup method according to claim 2, wherein the step of executing the non-real time backup procedure comprises:
    accessing an address of the current backup data block;
    copying data of the second primary data sub-block to the backup data block; and
    determining whether data of the second primary data sub-block is copied to the backup data block successfully.

4. The data backup method according to claim 3, wherein when data is not copied to the backup data block successfully, the method further comprises:
    transmitting out a backup data block abnormality notice; and
    turning off the backup data block.

5. The data backup method according to claim 3, further comprising
    determining whether the address of the current backup data block is an end address of the backup data block;
    if the address is the end address for the backup data block, the non-real time backup procedure is completed; and
    if the address is not the end address, the address of the current backup block is increased progressively.

6. The data backup method according to claim 2, wherein when the data storage system is not idle, the method further comprises;
    determining whether a write service request or an access service request is received;
    determining whether data of the primary data block needs to be backed up and whether the backup data block is normal if the write service request is received.

7. The data backup method according to claim 6, wherein if data does not need to be backed up or the backup data block is abnormal, the method further comprises:
    writing data to the first primary data sub-block; and
    transmitting a storage device damage notice when data is not written to the first primary data sub-block successfully.

8. The data backup method according to claim 6, wherein if data needs to backed up and the backup data block is normal, the method further comprises:
    writing data to the backup data block when the second primary data sub-block is turned off; and
    transmitting a storage device damage notice when data is not written to the backup data block successfully.

9. The data backup method according to claim 8, wherein when data is not written to the backup data block successfully, the method comprises:
    transmitting a backup data block abnormality notice; and
    turning off the backup data block.

10. The data backup method according to claim 6, wherein when the second primary data sub-block is not turned off, the method further comprises:
    writing data to the second primary data sub-block; and
    transmitting a primary data block abnormality notice and turning off the primary data block when data is not written to the second primary data sub-block successfully.

11. The data backup method according to claim 10, wherein when data is written to the second primary data sub-block successfully, the method further comprises:
    updating the address of the current backup data block to an address of data written to the second primary data sub-block when the address of data written to the second primary data sub-block is smaller than the address of the current backup data block;
    determining whether the data storage system is in the real time backup procedure; and
    if the data storage system is in the real time backup procedure, writing data to the backup data block.

12. The data backup method according to claim 6, wherein when receiving the access service request, the method further comprises:
    accessing the first primary data sub-block when to-be-accessed data is not backed up: and
    determining whether the first primary data sub-block is accessed successfully; and
    if the first primary data sub-block is not accessed, transmitting a storage device damage notice.

13. The data backup method according to claim 12, wherein when to-be-accessed data is backed up and the second primary data sub-block is turned off, the method further comprises:
    accessing the backup data block;
    determining whether the backup data block is accessed successfully; and
    if the backup data block is not accessed successfully, transmitting a storage device damage notice.

14. The data backup method according to claim 12, wherein when to-be-accessed data is backed up and the second primary data sub-block is turned off, the method step comprises:
  accessing the second primary data sub-block;
  determining whether the second primary data block is accessed successfully;
  if the second primary data block is not accessed successfully, turning off the second primary data sub-block and transmitting a primary data block abnormality notice.

15. A data storage system, comprising
  a storage device; and
  a storage controller coupled to the storage device, wherein the storage controller is used for dividing the storage device into a primary data block and a backup data block and setting the data storage system to be operated under one of a real time backup mode and a non-real time backup mode;
  wherein under the non-real time backup mode, when the data storage system is idle, the storage controller backs up data stored in the primary data block to the backup data block.

16. The data storage device according to claim 15, wherein the storage controller is used for dividing the primary data block into a first primary data sub-block and a second primary data sub-block, data stored in the first primary data sub-block does not need to be backed up to the backup data block, but data stored in the second primary data sub-block needs to be backed up to the backup data block;
  wherein the storage controller determines whether the data storage system is in the real time backup mode, whether a non-real time backup procedure is completed, and whether the primary data block is turned off when the data storage system is idle; and
  if the data storage system is not in the real time mode, the non-real time backup procedure is not completed, and the primary data block is not turned off, the storage controller executes the non-real time backup procedure.

17. The data storage device according to claim 16, wherein when executing the non-real time backup procedure, the storage controller accesses an address of the current backup data block, copies data of the second primary data sub-block to the backup data block, and determines whether data of the second primary data sub-block is copied to the backup data block successfully.

18. The data storage device according to claim 17, wherein when data is not copied to the backup data block successfully, the storage controller transmits a backup data block abnormality notice and turns off the backup data block.

19. The data storage device according to claim 17, wherein:
  the storage controller determines whether the address of the current backup data block is an end address of the backup data block;
  if the address is the end address for the backup data block, the storage controller sets a non-real time backup finish flag which indicates that the non-real time backup procedure is completed; and
  if the address is not the end address, the storage controller increases the address of the current backup block progressively.

20. The data storage device according to claim 16, wherein:
  the storage controller determines whether a write service request or an access service request is received when the data storage system is not idle; and
  if the write service request is received, then the storage controller determines whether data needs to be backed up and whether the backup data block is normal.

21. The data storage device according to claim 20, wherein:
  the storage controller writes data to the first primary data sub-block if data does not need to be backed up or the backup data block is abnormal; and
  the storage controller transmits a storage device damage notice when data is not written to the first the primary data sub-block successfully.

22. The data storage device according to claim 20, wherein:
  the storage controller writes data to the backup data block if the second primary data sub-block is turned off when data needs to be backed up and the backup data block is normal, and the storage controller transmits a storage device damage notice when data is not written to the backup data block successfully.

23. The data storage device according to claim 22, wherein the storage controller transmits a backup data block abnormality notice and turns off the backup data block when data is not written to the backup data block successfully.

24. The data storage device according to claim 20, wherein the storage controller writes data to the second primary data sub-block when the second primary data sub-block is not turned off, and the storage controller transmits a primary data block abnormality notice and turns off the primary data block when data is not written to the second primary data sub-block successfully.

25. The data storage device according to claim 24, wherein the storage controller updates the address of the current backup data block to the address of the data and determines whether the data storage system is in the real time backup procedure when data is successfully written to the second primary data sub-block and when an address of data successfully written to the second primary data sub-block is smaller than the address of the current backup data block; if the data storage system is in the real time backup procedure, the storage controller writes data to the backup data block.

26. The data storage device according to claim 20, wherein:
  the storage controller accesses the first primary data sub-block and determines whether the first primary data sub-block is successfully accessed during receiving of the access service request when to-be-accessed data is not backed up; and
  if the first primary data sub-block is not accessed, the storage controller transmits a storage device damage notice.

27. The data storage device according to claim 26, wherein:
  the storage controller accesses the backup data block when to-be-accessed data is backed up and the second primary data sub-block is turned off;
  the storage controller determines whether the backup data block is accessed successfully; and
  if the backup data block is not accessed successfully, the storage controller transmits a storage device damage notice.

28. The data storage device according to claim 26, wherein:
  the storage controller accesses the second primary data sub-block and determines whether the second primary data sub-block is accessed successfully when to-be-accessed data is backed up and the second primary data sub-block is turned off; and
  if the second primary data block is not accessed successfully, the storage controller turns off the second primary data block and transmits a primary data block abnormality notice.

* * * * *